US005774496A

United States Patent [19]
Butler et al.

[11] Patent Number: 5,774,496
[45] Date of Patent: *Jun. 30, 1998

[54] METHOD AND APPARATUS FOR DETERMINING DATA RATE OF TRANSMITTED VARIABLE RATE DATA IN A COMMUNICATIONS RECEIVER

[75] Inventors: Brian K. Butler, Solana Beach; Roberto Padovani, San Diego; Ephraim Zehavi, Del Mar, all of Calif.

[73] Assignee: QUALCOMM Incorporated, San Diego, Calif.

[ * ] Notice: The term of this patent shall not extend beyond the expiration date of Pat. No. 5,566,206.

[21] Appl. No.: 658,030

[22] Filed: Jun. 4, 1996

Related U.S. Application Data

[63] Continuation of Ser. No. 233,570, Apr. 26, 1994, Pat. No. 5,566,206.
[51] Int. Cl.[6] .................................................. H04B 17/00
[52] U.S. Cl. ............................ 375/225; 375/341; 371/5.1
[58] Field of Search ............................... 380/34; 375/224, 375/225, 200, 362, 377, 341, 240; 371/5.1, 5.4, 37.7, 67.1, 68.1; 370/13, 118, 119

[56] References Cited

U.S. PATENT DOCUMENTS

| | | | |
|---|---|---|---|
| 3,908,169 | 9/1975 | Tong ........................................ | 325/320 |
| 4,686,686 | 8/1987 | Nakayama et al. ...................... | 375/11 |
| 4,849,998 | 7/1989 | Poklemba ................................. | 375/121 |
| 4,903,301 | 2/1990 | Kondo et al. ............................. | 381/30 |
| 5,109,390 | 4/1992 | Gilhousen et al. ........................ | 375/1 |
| 5,113,400 | 5/1992 | Gould et al. .............................. | 371/43 |
| 5,241,535 | 8/1993 | Yoshikawa ................................ | 370/60 |
| 5,453,997 | 9/1995 | Roney, IV ................................. | 375/341 |

OTHER PUBLICATIONS

N. Seshadri et al., "Generalized Viterbi Algorithms For Error Detection With Convolutional Codes", *IEEE*, AT&T Bell Laboratories, Murray Hill, New Jersey 07974, 1989, pp. 1534–1538.

Hirosuke Yamamoto et al., "Viterbi Decoding Algorithm For Convolutional Codes With Repeat Request", *IEEE* Transactions On Information Theory, vol. It–26. No. 5., Sep. 1980, pp. 540–547.

U. Grob et al., Microcellular Direct–Sequence Spread Spectrum Radio System Using N–Path Rake Receiver, Sep. 1989, 23 pages.

*Primary Examiner*—Temesghen Ghebretinsae
*Attorney, Agent, or Firm*—Russell B. Miller; Linli Golden

[57] ABSTRACT

A system for determining the rate at which data has been encoded in the receiver of a variable-rate communications system. The data is received in frames having a fixed number of symbols. Multiple copies of symbols fill the frame when data is encoded at less than the full rate. At an encoding rate of one fourth the full rate, for example, each symbol in the frame is repeated four times. The incoming symbols are provided to multiple paths for decoding. Each path decodes the symbols at one of the possible rates. Error metrics, which describe the quality of the decoded symbols, are extracted and provided to a processor. The error metrics may include Cyclic Redundancy Check (CRC) results, Yamamoto Quality Metrics, and Symbol Error Rates. The processor analyzes the error metrics and determines the most probable rate at which the incoming symbols were encoded.

51 Claims, 4 Drawing Sheets

METHOD AND APPARATUS FOR DETERMINING DATA RATE OF TRANSMITTED VARIABLE RATE DATA IN A COMMUNICATIONS RECEIVER

This is a Continuation of application Ser. No. 08/233,570 filed Apr. 26, 1994 U.S. Pat. No. 5,566,206.

BACKGROUND OF THE INVENTION

The present invention relates generally to digital communications. More specifically, the present invention relates to a system in which variable rate data is transmitted without an indication of the data rate and is received at a communications receiver where the data rate of the transmitted data is determined for use in processing the data.

In digital communications systems, particularly those which use spread spectrum modulation, a transmitter may employ a vocoding system which encodes voice information at a variable rate to lower the data rate during pauses or other absences of voice activity, thereby reducing the level of interference caused by this transmitter to receivers other than the intended receiver. At the receiver, or otherwise associated with the receiver, a vocoding system is employed for reconstructing the voice information. It should be understood that in addition to voice information, non-voice information alone or a mixture of the two may be transmitted to the receiver.

A vocoder which is suited for application in this environment is described in U.S. Pat. No. 5,414,796, issued May 9, 1995, entitled "VARIABLE RATE VOCODER," and assigned to the assignee of the present invention. This vocoder produces from digital samples of the voice information encoded data at four different rates, e.g. approximately 8,000 bits per second (bps), 4,000 bps, 2,000 bps and 1,000 bps, based on voice activity during a 20 millisecond (ms) frame. Each frame of vocoder data is formatted with overhead bits as 9,600 bps, 4,800 bps, 2,400 bps, and 1,200 bps data frames. The highest rate data frame which corresponds to a 9,600 bps frame is referred to as a "full rate" frame; a 4,800 bps data frame is referred to as a "half rate" frame; a 2,400 bps data frame is referred to as a "quarter rate" frame; and a 1,200 bps data frame is referred to as an "eighth rate" frame. In neither the encoding process nor the frame formatting process is rate information included in the data.

Additional details on the formatting of the vocoder data into data frames are described in copending U.S. patent application Ser. No. 08/171,146, filed Dec. 21, 1993 which is a continuation of U.S. patent application Ser. No. 07/822, 164, entitled "METHOD AND APPARATUS FOR THE FORMATTING OF DATA FOR TRANSMISSION," filed Jan. 16, 1992 now abandoned and assigned to the assignee of the present invention. The data frames may be further processed, spread spectrum modulated and transmitted as described in U.S. Pat. No. 5,103,459, entitled "SYSTEM AND METHOD FOR GENERATING WAVEFORMS IN A CDMA CELLULAR TELEPHONE SYSTEM," issued Apr. 7, 1992, and assigned to the assignee of the present invention, the disclosure of which is incorporated by reference herein.

Since rate information for each frame is not transmitted, the receiver must determine from the received frame of data the rate at which they were encoded in order for the vocoder to properly reconstruct the voice information. Although the transmitter could transmit information regarding the rate at which the frame was encoded this would reduce system resources available for transmitting voice and non-voice data. Furthermore corruption in the transmitted rate information would adversely affect the entire frame. Thus, it is desirable for the receiver to determine the rate at which the frame was encoded without receiving rate information from the transmitter. These problems and deficiencies are clearly felt in the art and are solved by the present invention in the manner described below.

SUMMARY OF THE INVENTION

The present invention relates to a system for determining at a receiver of a variable rate communications system the rate at which data has been encoded by a transmitter of the communications system. Although the present invention may be used in many communications systems, it is particularly useful in cellular communication systems that use a variable rate vocoder for encoding and decoding speech at a plurality of discrete rates or a variable rate data transfer protocol. Such communication systems include mobile telephone, personal communication devices, wireless local loop and private branch exchange, and particularly those that use spread spectrum modulation. The present invention may be used in the receivers of both the "mobile station" and the cell site or "base station" or wherever the receiving vocoder is located in a system such as a cellular telephone system to provide the receiver vocoder with rate information, thereby enabling the receiver vocoders to decode the encoded speech.

The present invention receives a frame consisting of a predetermined number of symbols which represents speech that was digitized and encoded by the transmitter vocoder during a predetermined time period. The received frame may consist of multiple copies of each symbol if the transmitter vocoder encoded the speech at less than a predetermined maximum rate.

Each frame of received symbols are decoded at each of the possible rates. Error metrics, which describe the quality of the decoded symbols for each frame decoded at each rate, are provided to a processor. The error metrics may include Cyclic Redundancy Check (CRC) results, Yamamoto Quality Metrics, and Symbol Error Rates. These error metrics are well-known in communications systems. The processor analyzes the error metrics using a novel decision process and determines the most probable rate at which the incoming symbols were encoded. The processor may provide the rate information to the receiver vocoder or other devices.

The foregoing, together with other features and advantages of the present invention, will become more apparent when referring to the following specification, claims, and accompanying drawings.

BRIEF DESCRIPTION OF THE DRAWINGS

For a more complete understanding of our invention, we now refer to the following detailed description of the embodiments illustrated in the accompanying drawings, wherein.

DESCRIPTION OF THE PREFERRED EMBODIMENT

Figure 1:
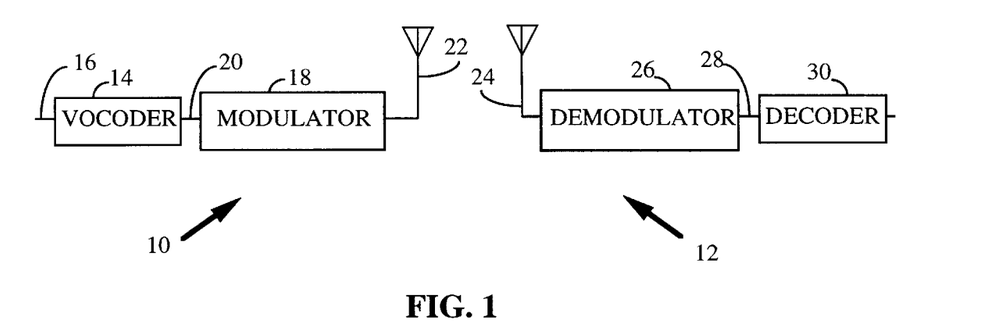
FIG. 1 is a block diagram showing the present invention in the receiver of a cellular telephone system.

In FIG. 1, a digital communication system is illustrated. For purposes of example this system is described herein within the context of a CDMA cellular telephone system. However it should be understood that the invention is applicable to other types of communication systems such as personal communication systems (PCS), wireless local loop, private branch exchange (PBX) or other known systems. Furthermore systems employing other well known transmission modulation schemes such as TDMA may employ the present invention. The system in FIG. 1 comprises a transmitter 10 and a receiver 12, which may be either a base station (also known as a cell-site) receiver or a mobile station receiver. Communication from transmitter 10 to receiver 12 when receiver 12 is disposed in a mobile station is known as the "forward link," and communication from transmitter 10 to receiver 12 when receiver 12 is disposed in a base station is known as the "reverse link".

Transmitter 10 in an exemplary embodiment comprises a vocoder 14, which encodes voice data 16 for formatting into data frames of various data rates, e.g. frame rates of 9,600 bps, 4,800 bps, 2,400 bps, or 1,200 bps. Vocoder 14 selects a rate in response to the amount of voice activity in voice data 16, as described in the above-referenced U.S. Pat. No. 5,414,796 and encodes the voice data accordingly. Vocoder data bits 20 and the determined rate are provided to modulator 18. Modulator 18 is described in the above-referenced U.S. Pat. No. 5,103,459, and is briefly discussed herein for background information. Although the present invention is discussed with respect to four different data rates, it should be understood, however, that the teachings of the present invention are applicable to systems where a greater or lesser number of data rates may be employed. Furthermore the data rates discussed herein are for purposes of example and other data rates may be used. For example, an alternative set of frame rates may be 14,400 bps, 7,200 bps, 3,600 bps, and 1,800 bps.

By way of example, the following data frame information is provided for a further understanding of the frame formatting. As mentioned previously, all frames are 20 ms in duration. A vocoder full-rate frame is comprised of 160 data bits and 11 internal check bits. This full-rate vocoder frame is formatted by modulator 18 into a 9,600 bps transmission frame which is comprised of 192 bits. These 192 bits are formed from the 171 vocoder-produced data bits, a mode bit, 12 CRC bits and 8 tail bits. A vocoder half-rate frame is comprised of 80 bits and may be formatted into a 4,800 bps transmission frame of 96 bits. The 4,800 bps transmission frame is comprised of the 80 vocoder bits along with 8 CRC bits and 8 tail bits. A vocoder quarter-rate frame is comprised of 40 bits and may be formatted into a 2,400 bps transmission frame of 48 bits. The 2,400 bps transmission frame includes along with the 40 vocoder bits, 8 tail bits. Finally, a vocoder eighth-rate frame is comprised of 16 bits and may be formatted into a 1,200 bps transmission frame of 24 bits. The 1,200 bps transmission frame includes along with the 16 vocoder bits, 8 tail bits.

It should be understood that a mixture of voice and non-voice data may be formatted into a 9,600 bps transmission frame when less than full-rate vocoder data is provided. The mode bit and additional overhead bits are included in this type of frame to indicate the rate at which the voice data is encoded. Regardless of the rate of the voice data in this type of frame, the frame as received is determined to be a 9,600 bps frame which contains less than full-rate vocoder data. As such the overhead bits are used to override the output of a full-rate frame indication to the vocoder for processing of the portion of the bits in the frame which correspond to the less than full-rate frame vocoder data. Furthermore it should be understood that the vocoder data may be replaced in a full-rate transmission frame by non-voice data. Again in this case overhead bits included in the frame identify the frame of this type. In an alternative embodiment, the variable rate data may comprise variable rate non-voice data. The non-voice data could be transmitted at a maximum rate as determined at the initiation of the transmission. During transmission, data could be transmitted at the maximum rate and at several sub-rates analogous to the various rates used for voice data. A similar rate determination process would be used to determine the rate or sub-rate of the transmitted non-voice data.

Modulator 18 includes circuitry (not shown) which adds cyclic redundancy check (CRC) bits to full and half-rate frames and tail bits to all rate frames (not shown) to vocoder data bits 20. Modulator 18 preferably includes an encoder (not shown) which convolutionally encodes each frame of data (not shown) to produce frames of symbol data. In the forward link the convolutional encoding is preferably rate one-half, and in the reverse link the convolutional encoding is preferably rate one-third.

Each frame of symbol data is interleaved by an interleaver (not shown), preferably on a bit level basis, to increase time diversity for purposes of error correction. For those frames corresponding to a data rate less than the highest data rate, e.g. 9,600 bps, modulator 18 repeats symbol data to maintain a constant symbol rate for the frame. In other words, if the rate selected by vocoder 14 is less than that which corresponds to a 9,600 bps frame rate, modulator 18 repeats the symbols to fill the frame with the number of repeats dependent upon the data rate. For a frame corresponding to a 9,600 bps data rate, all symbols are provided by modulator 18 in an interleaved data frame. However for a frame corresponding to a 4,800 bps data rate, modulator 18 provides the symbols twice in an interleaved data frame. Similarly for frames corresponding to 2,400 bps and 1,200 bps data rates, modulator 18 respectively provides the symbols four times and eight times into an interleaved data frame. Thus in this exemplary embodiment, a frame of symbol data consists of 384 symbols for forward link communication (rate one-half coding) for a symbol frame rate of 19,200 symbols per second (sps).

The frames of symbol data are bi-phase shift key (BPSK) modulated with orthogonal covering of each BPSK symbol along with quadrature phase shift key (QPSK) spreading of the covered symbols as disclosed in U.S. Pat. No. 5,103,459. On the forward link, modulator 18 transmits the frame as a continuous stream of modulated symbol data 22 with the power of each transmitted frame reduced according to the symbol repetition in the frame.

On the reverse link, modulator 18 uses orthogonal signalling techniques along with QPSK spreading and BPSK modulation as disclosed in U.S. Pat. No. 5,103,459. Modulator 18 also includes a data burst randomizer (not shown), which transmits the frame in bursts of symbol data 22, Further details on the data burst randomizer are described in copending U.S. patent application Ser. No. 08/194,823, filed Feb. 14, 1994, which is a continuation of U.S. patent application Ser. No. 07/846,312, entitled "DATA BURST RANDOMIZER," filed Mar. 5, 1992, now abandoned and assigned to the assignee of the present invention. Using the data burst randomizer, non-full rate data is sent in gated time segments. The ratio of the data burst segments to the total time is proportional to the data rate. Thus in the exemplary embodiment, a frame of full rate data consists of 576 symbols (rate one-third coding) for a symbol frame rate of 28,800 sps; a frame of half rate data consists of 288 symbols at a symbol frame rate of 28,800 sps transmitted with a 50% duty cycle; a frame of quarter rate data consists of 144 symbols at a symbol frame rate of 28,800 sps transmitted with a 25%, duty cycle; a frame of eighth rate data consists of 72 symbols at a symbol frame rate of 28,800 sps transmitted with a 12.5% duty cycle.

Receiver 12 comprises a demodulator 26 for demodulating and deinterleaving received symbol data 24. Demodulator 26 provides symbol data 28 to decoder 30, which includes the rate-determination system of the present invention. Demodulation symbols data 28 is "soft decision data" because it is the actual values of the I and Q components of the received symbol data 24 which is comprised of the transmitted symbol data 22 and the interferences rather than being the binary representation of a decision on the most likely transmitted symbol. The use of soft decision data in the decoding process is described in copending U.S. patent application Ser. No. 08/126,477, entitled "MULTIRATE SERIAL VITERBI DECODER FOR CODE DIVISION MULTIPLE ACCESS SYSTEMS APPLICATIONS," filed Sep. 24, 1993, and assigned to the assignee of the present invention.

Figure 2:
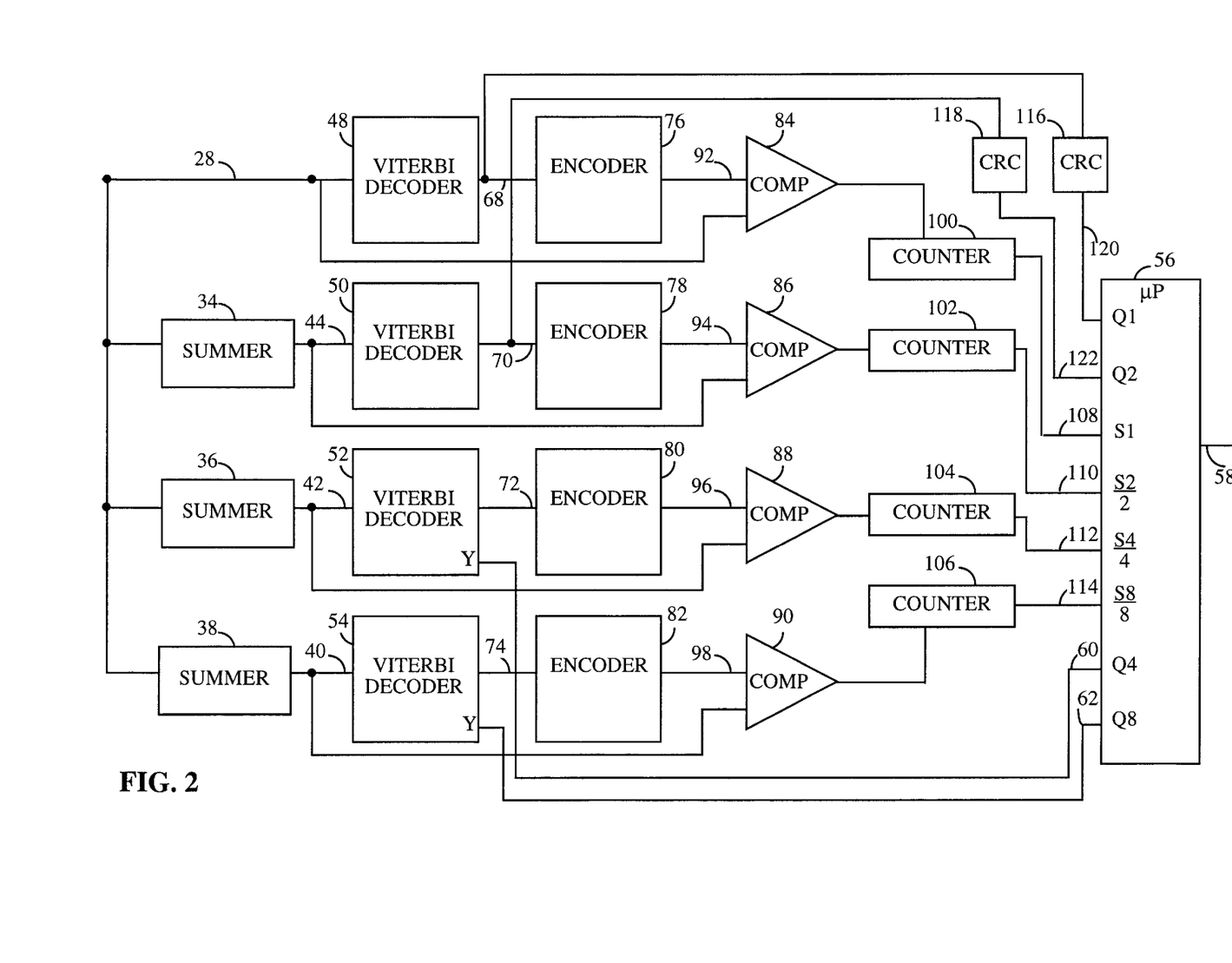
FIG. 2 is a block diagram of the rate determination apparatus of the base station receiver of a cellular telephone system.

The apparatus shown in FIG. 2 determines the rate at which data is encoded for a forward link transmission. The apparatus as illustrated in FIG. 2 (and in FIG. 3 subsequently introduced) is shown as having multiple parallel paths for data processing for ease in understanding of the invention. However, it should be understood that only a single path is preferred with a sharing of circuit elements so as to reduce the circuit element count. In this shared element arrangement, the demodulated symbol data is stored in a buffer (not shown) as received and provided to the path for repeated processing of the data for each of the possible data rates. The decoded output for each data rate is also stored until the rate determination has been made. The stored decoded output corresponding to the selected data rate is then passed to subsequent stages for further processing. Further details on the decoding of the frame data and production of the quality metrics are disclosed in the just mentioned copending U.S. patent application Ser. No. 08/126,477. In the present invention the parameters and data generated by this decoder are used to determine the frame rate of the transmitted data from each of the possible frame rates.

In FIG. 2, demodulated symbol data 28 is provided to each of summers 34, 36, and 38. As mentioned before, for the forward link transmitted frames, symbols are repeated for lower rate frames to achieve a constant number of symbols in a frame as transmitted. In order to provide an increase in quality, at the receiver the repeated symbols are summed and scaled to provide for each set of repeated symbols a combined symbol representative of the original symbol before repetition on the transmit end. Summer 38 sums every 8 symbols and provides a scaled sum symbol data 40. Summer 36 sums every 4 symbols and provides a scaled sum symbol data 42. Summer 34 sums every 2 symbols and provides scaled sum symbol data 44. Thus, summers 34, 36, and 38 correspond to half-rate data through eighth-rate data, respectively.

Each of four Viterbi decoders 48, 50, 52, and 54 decode symbol data 28 and convolutionally-encoded scaled sum symbol data 44, 42, and 40, respectively to provide corresponding bit data. Viterbi decoders 52 and 54 include means for producing Yamamoto Quality Metrics 60 and 62, respectively, which are provided to microprocessor 56 as Q4 and Q8 respectively. Yamamoto Quality Metrics 60 and 62 are each typically represented by a one bit value for each frame. A Yamamoto Quality Metric is a well known indicator of data quality. In other embodiments, Viterbi decoders 48 and 50 may produce Yamamoto Quality Metrics, as well. However since other more precise quality indicators are present in the higher rate data, the use of the Yamamoto Quality Metrics is generally not necessary. In other embodiments, Yamamoto Quality Metrics 60 and 62 may be produced by circuitry external to Viterbi decoders 52 and 54.

As mentioned previously, each of Viterbi decoders 48–54 produce decoded symbol data or bit data 68, 70, 72, and 74, respectively. Encoders 76, 78, 80, and 82 re-encode the decoded symbol data 68–74, respectively. Comparators 84, 86, 88, and 90 compare re-encoded bit data 92, 94, 96, and 98 to demodulated symbol data 28, scaled sum symbol data 44, 42, and 40, respectively. Counters 100, 102, 104, and 106 count the number of symbols that do not match. Counters 100–106 produce Symbol Error Rates 108, 110, 112, and 114, respectively, which are each represented by an eight bit value. Symbol Error Rates 108–114 represent the number of mismatches in a frame and are provided to microprocessor 56 as S1, S2/2, S4/4, and S8/8 respectively.

Cyclic redundancy check (CRC) circuits 116 and 118 check the CRC bits of decoded symbol data (bit data) 68 and 70, respectively. CRC circuits 116 and 118 provide CRC results 120 and 122, respectively, to microprocessor 56 as Q1 and Q2 respectively. In other embodiments, circuits may be provided to check the CRC bits of decoded symbol data (bit data) 72 and 74 as well if so provided. In the exemplary embodiment disclosed herein, and in the copending patent applications and U.S. Pat. No. 5,103,459, CRC results 120 and 122 are each typically represented by a one bit value.

Figure 3:
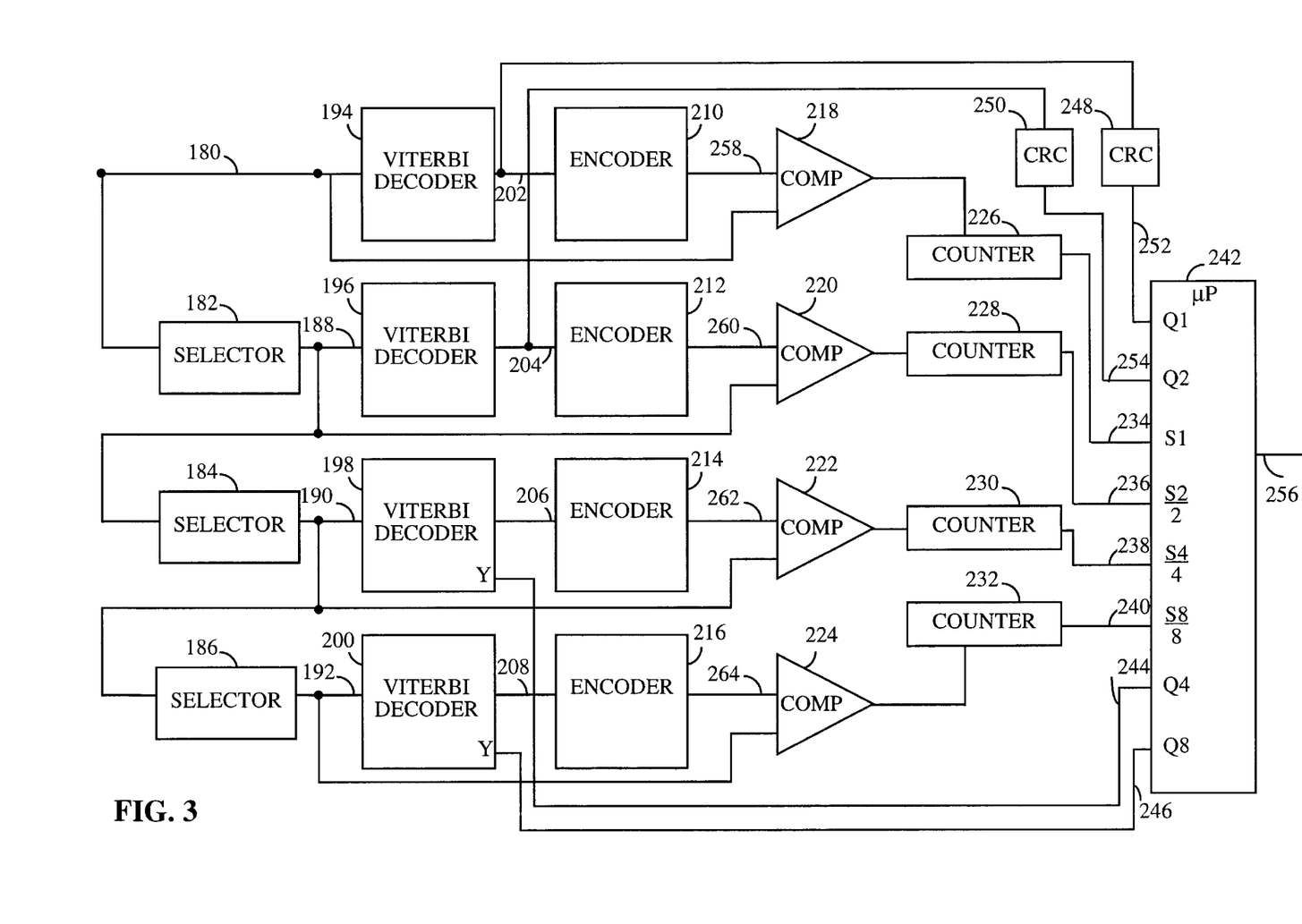
FIG. 3 is a block diagram of the rate determination apparatus of the mobile station receiver of a cellular telephone system.

In the reverse link, decoder 30 comprises the apparatus shown in FIG. 3. Soft-decision symbol data 180 comprises time-gated bursts of symbols (not shown). Modulator 18 pseudorandomly masks out the redundant symbols in frames transmitted at less than full-rate using an process described in above-referenced U.S Pat. No. 5,103,459, and further described in copending U.S. patent application Ser. No. 08/194,823 now U.S. Pat. No. 5,659,569. Again in FIG. 3, as in FIG. 2, the apparatus is illustrated as having multiple parallel paths for data processing for ease in understanding. However it should be understood that a single path is preferred using shared circuit elements. In the shared element arrangement the demodulated data is stored in a buffer (not shown) as received and provided to the path for repeated processing of the frame for each of the possible data rates. In FIG. 3, selector 182 receives symbol data 180 and extracts one-half the symbols to produce selected symbol data 188; selector 184 receives selected symbol data 188 and extracts one-half the symbols to produce selected symbol data 190; and selector 186 receives selected symbol data 190 and extracts one-half the symbols to produce selected symbol data 192. As mentioned in conjunction with the reverse link, symbols are repeated to achieve a constant number of symbols in the frame. However upon transmission only one set of each different repeated symbols sets are actually transmitted. On the receiver end the received symbols are treated as being symbol sets for the various possible rates. Viterbi decoder 194 receives symbol data 180; Viterbi decoder 196 receives selected symbol data 188; Viterbi decoder 198 receives selected symbol data 190; and Viterbi decoder 200 receives selected symbol data 192. Thus, Viterbi decoders 194–200 correspond to data encoded at full-rate through eighth-rate, respectively. Viterbi decoders 194, 196, 198, and 200 produce decoded symbol data or bit data 202, 204, 206, and 208, respectively. As in the forward link, each of Viterbi decoders 194–200 is most likely to produce decoded symbol data 202–208, respectively, having the least errors when the data is encoded at the rate to which it corresponds.

Encoders 210, 212, 214, and 216 re-encode decoded symbol data 202–208, respectively. Comparators 218, 220, 222, and 224 compare re-encoded symbol data 258, 260, 262, and 264, respectively, to symbol data 180, and selected symbol data 188, 190, and 192, respectively. Counters 226, 228, 230, and 232 count the number of symbols that do not match. Counters 226–232 produce Symbol Error Rates 234, 236, 238, and 240, respectively, which are each represented by an eight bit value. Symbol Error Rates 234, 236, 238, and 240 represent the number of mismatches in a frame and are provided to microprocessor 242 as S1, S2/2, S4/4, and S8/8, respectively.

Viterbi decoders 198 and 200 also produce Yamamoto Quality Metrics 244 and 246, respectively, which are provided to microprocessor 242 as Q4 and Q8 respectively. In other embodiments, Yamamoto Quality Metrics 244 and 246 may be produced by circuitry external to Viterbi decoders 198 and 200. As discussed previously the Yamamoto Quality Metrics are represented by a single bit value.

Cyclic redundancy check (CRC) circuits 248 and 250 check the CRC bits of decoded symbol data 202 and 204, respectively. CRC circuits 248 and 250 provide CRC results 252 and 254, respectively, to microprocessor 242 as Q1 and Q2, respectively. In other embodiments, circuits may be provided to check the CRC bits of decoded symbol data 206 and 208, as well. CRC results 252 and 254 are each typically represented by a one bit value.

Figure 4:
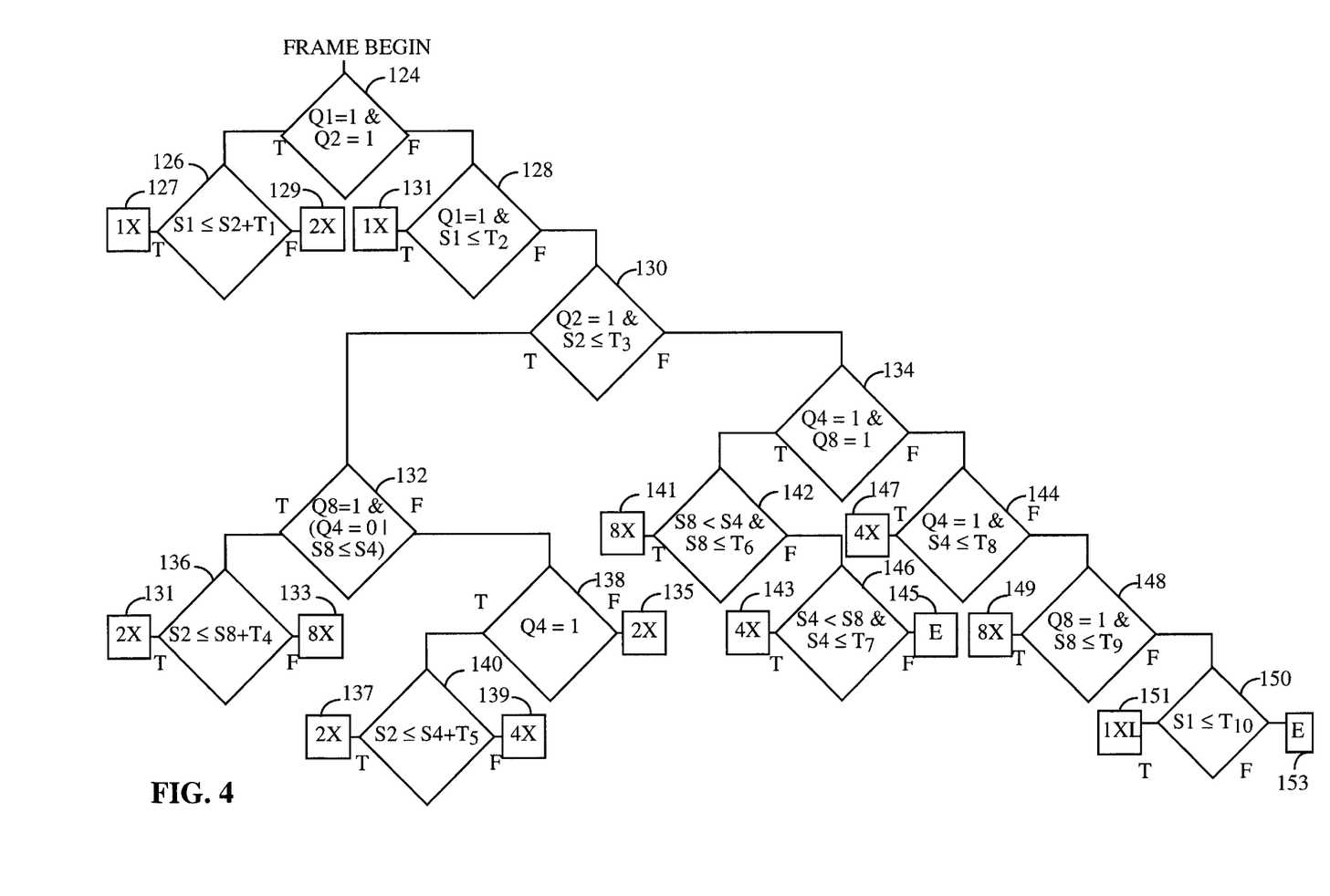
FIG. 4 is a flow diagram of a rate determination process.

Microprocessors 56 and 242 use an process illustrated by the binary decision tree shown in FIG. 4 to determine the rate at which data is encoded in a forward link and reverse link transmission, respectively. The reverse link rate determination process is the same as the forward link rate determination process with the exception of some of the threshold values in the expressions. The threshold values in the process are a function of the link and can be modified for different environments. Table 1 gives a set of value for the ten thresholds of FIG. 4. The inputs to the process are collectively known as "error metrics" and comprise CRC results Q1 and Q2, Yamamoto Quality Metrics Q4 and Q8, and Symbol Error Rates S1, S2/2, S4/4, and S8/8 which correspond to microprocessor inputs from either FIG. 2 or FIG. 3.

The values for $T_1-T_{10}$ as expressed in Table I are based on the number of symbols per frame. The number of symbols per frame is 384 symbols/frame for the forward link communication, encoded at rate one-half, and 576 symbols/frame for reverse link communication, encoded at rate one-third, as stated above. On the reverse link, due to the rate one-third encoding, the encoder produces three symbols of output for each data bit of input. The entries in Table I reflect a "short cut" in the error comparison process on the reverse link. Instead of comparing each of the three symbols output from the encoder to the originally received symbols, the comparator only compares two of the three symbols. This process reduces the required parallel circuitry while yielding the same average results as comparing all three symbols. Therefore the entries given in Table I reflect the comparison of 384 symbols/frame (equal to the two-thirds of the actual 576 symbols received each frame) and a corresponding scaling in the S1, S2, S4, and S8 values. The most general expression for the empirical results of Table I are given in the columns labeled Forward Link % and Reverse Link % which give $T_1-T_{10}$ as a percentage of the number of symbols in a frame.

TABLE I

| Threshold | Forward Link | Reverse Link | Forward Link % | Reverse Link % |
|---|---|---|---|---|
| $T_1$ | 15 | 15 | 3.9% | 3.9% |
| $T_2$ | 77 | 110 | 20.1% | 28.6% |
| $T_3$ | 60 | 84 | 15.6% | 21.9% |
| $T_4$ | 10 | 10 | 2.6% | 2.6% |
| $T_5$ | 10 | 10 | 2.6% | 2.6% |
| $T_6$ | 64 | 96 | 16.7% | 25% |
| $T_7$ | 60 | 76 | 15.6% | 19.8% |
| $T_8$ | 60 | 76 | 15.6% | 19.8% |
| $T_9$ | 64 | 96 | 16.7% | 25% |
| $T_{10}$ | 71 | 78 | 18.5% | 20.3% |

With regard to Table I, it should be noted that the expressions in both the forward link process and the reverse link process shown in FIG. 4 reflect the results of empirical studies primarily on voice data for the particular frame and modulation numerology disclosed herein and in the copending patent applications previously identified and U.S. Pat. No. 5,103,459. Other expressions may provide better results when non-voice data, such as facsimile data, is transmitted or when the system is operating over a different environment, such as indoor environments. Accordingly, other values may be readily used in the Symbol Error Rate comparisons, for comparison levels and added constant values.

The process described with reference to FIG. 4 is executed once for each frame. To normalize the input to the decision process, the S values for the non-full rate data processes are multiplied times the S2 S4 inverse of the data rate. In this case S2=2×S2/2, S4=4×S4/4, S8=8×S8/8. Upon beginning the process for the frame if the expression at node 124 is true, then the microprocessor proceeds to node 126; if false, then the microprocessor proceeds to node 128. At node 124, the expression "Q1=1 & Q2=1" signifies that CRC result Q1 is equal to one and CRC result Q2 is equal to one. In this embodiment, CRC values of one (1) and zero (0) respectively represent that the CRC for the received frame of data was 20 correct and incorrect respectively. Throughout the tree, the symbol "&" denotes a Boolean AND operator, the symbol "|" denotes a Boolean OR operator, and the symbols "=" and "$\leq$" both denote relational operators.

At node 126, the expression "S1<S2+$T_1$" signifies that Symbol Error Rate S1 is less than or equal to Symbol Error Rate S2 plus a threshold value $T_1$ which is equal to 15 for both the forward and reverse links according to Table I. If the expression at node 126 is true, then the microprocessor determines that the rate is full-rate at output 127 and provides a corresponding frame rate indication; if false, then the microprocessor determines that the rate is half-rate at output 129 and provides a corresponding frame rate indication.

At node 128, the expression "Q1=1 & S1$\leq T_2$" signifies that CRC result Q1 is equal to one and Symbol Error Rate S1 is less than or equal to a symbol error rate of $T_2$ which is equal to 77 for the forward link and equal to 110 for the reverse link. If the expression at node 128 is true, then the microprocessor determines that the rate is full-rate at output 131 and provides a corresponding frame rate; if false, then the microprocessor proceeds to node 130.

At node 130, the expression "Q2=1 & S2≦T$_3$" signifies that CRC result Q2 equals one and Symbol Error Rate S2 is less than or equal to a symbol error rate of T$_3$. If the expression at node 130 is true, the microprocessor proceeds to node 132; if false, then the microprocessor proceeds to node 134.

At node 132, the expression "Q8=1 & (Q4=0 | S8≦S4)" signifies that Yamamoto Quality Metric Q8 is equal to one and the expression signifying that Yamamoto Quality Metric Q4 is equal to zero or Symbol Error Rate S8 is less than or equal to Symbol Error Rate S4 is true. Again for this embodiment, Yamamoto Quality Metric values of one (1) and zero (0) respectively indicate a high or low probability of correct decoding of the symbol data by the Viterbi decoder.

If the expression at node 132 is true, then the microprocessor proceeds to node 136; if false, the microprocessor proceeds to node 138. At node 136, the expression "S2≦S8+T$_4$" signifies that Symbol Error Rate S2 is less than or equal to Symbol Error Rate S8 plus T$_4$. If the expression at node 136 is true, then the microprocessor determines that the rate is half-rate at output 131 and provides a corresponding frame rate indication; if false, then the microprocessor determines that the rate is eight-rate at output 133 and provides a corresponding frame rate indication.

At node 138, the expression "Q4=1" signifies that Yamamoto Quality Metric Q4 is equal to one. If the expression at node 138 is true, then the microprocessor proceeds to node 140; if false, then the microprocessor determines that the rate is half-rate at output 135 and provides a corresponding frame rate indication. At node 140, the expression "S2≦S4+T$_5$" signifies that Symbol Error Rate S2 is less than or equal to Symbol Error Rate S4 plus T$_5$. If the expression at node 140 is true, then the microprocessor determines that the rate is half-rate at output 137 and provides a corresponding frame rate indication; if false, then the microprocessor determines that the rate is quarter-rate at output 139 and provides a corresponding frame rate indication.

At node 134, the expression "Q4=1 & Q8=1" signifies that Yamamoto Quality Metric Q4 equals one and Yamamoto Quality Metric Q8 equals one. If the expression at node 134 is true, then the microprocessor proceeds to node 142; if false, then the microprocessor proceeds to node 144. At node 142, the expression "S8<S4 & S8<T$_6$" signifies that Symbol Error Rate S8 is less than Symbol Error Rate S4 and Symbol Error Rate S8 is less than or equal to a symbol error rate of T$_6$. If the expression at node 142 is true, then the microprocessor determines that the rate is eighth-rate at output 141 and provides a corresponding frame rate indication; if false, then the microprocessor proceeds to node 146. At node 146, the expression "S4<S8 & S4<T$_7$" signifies that Symbol Error Rate S4 is less than Symbol Error Rate S8 and Symbol Error Rate S4 is less than or equal to a symbol error rate of T$_7$. If the expression at node 146 is true, then the microprocessor determines that the rate is quarter-rate at output 143 and provides a corresponding frame rate indication; if false, then the microprocessor cannot determine the rate and provides an "erasure" indication at output 145. Because the receiver vocoder (not shown) cannot decode a frame unless the microprocessor provides it with the rate, the receiver vocoder ignores the current frame and interpolates the voice data between the previous frame and the next frame in response to the erasure indication.

At node 144, the expression "Q4=1 & S4<T$_8$" signifies that Yamamoto Quality Metric Q4 equals one and Symbol Error Rate S4 is less than or equal to a symbol error rate of T$_8$. If the expression at node 144 is true, then the microprocessor determines that the rate is quarter-rate at output 147 and provides a corresponding frame rate indication; if false, then the microprocessor proceeds to node 148. At node 148, the expression "Q8=1 & S8<T$_9$" signifies that Yamamoto Quality Metric Q8 equals one and Symbol Error Rate S8 is less than or equal to a symbol error rate of T$_9$. If the expression at node 148 is true, then the microprocessor determines that the rate is eighth-rate at output 149 and provides a corresponding frame rate indication; if false, then the microprocessor proceeds to node 150. At node 150, the expression "S1≦T$_{10}$" signifies that Symbol Error Rate S1 is less than or equal to a symbol error rate of T$_{10}$. If the expression at node 150 is true, then the microprocessor determines that the rate is likely to be full-rate but the frame is likely to contain bit errors. Therefore, the microprocessor provides a "full-rate likely" frame rate indication at output 151. If the expression at node 150 is false, then the microprocessor provides an erasure indication at output 153.

As mentioned previously, on occasion less than full-rate frame vocoder data may be transmitted along with non-voice data in a 9,600 bps transmission frame. Although the microprocessor will determine that the frame is a full-rate frame, it will inspect the mode bit to determine if in fact the frame is comprised of full-rate vocoder data. If the mode bit indicates that the frame is comprised of full-rate vocoder data then this indication is provided to the vocoder. However, should the mode bit indicate that the frame is comprised of a mixture of vocoder data and non-voice data, or all non-voice data, then a further inspection of the additional overhead bits transmitted in type of frame is undertaken. From these additional overhead bits the rate of the vocoder data, if present, is indicated. In those cases where vocoder data is present in this type of frame, the microprocessor provides to the receiver vocoder the indicated frame rate of the vocoder data rather than that determined from the received transmission frame. In the case where the received transmission frame is comprised of all non-voice data, and so indicated by the overhead bits, the microprocessor provides a blank erasure indication to the receiver vocoder.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. In a receiver of a variable-rate communication system, a method for determining a data rate of a received signal comprising the steps of:

decoding and re-encoding at a first data rate said received signal to produce a first received signal prediction and to produce a first quality indication;

comparing said first received signal prediction to said received signal and counting a first number of errors, wherein an error occurs when said received signal does not match said first received signal prediction, and wherein said first number of errors and said first quality indication define a first error metric;

reducing said received signal to produce a second received signal representing a second data rate;

decoding and re-encoding at said second data rate said second received signal to produce a second received signal prediction and to produce a second quality indication;

comparing said second received signal prediction to said second received signal and counting a second number of errors, wherein an error occurs when said second received signal does not match said second received signal prediction, and wherein said second number of errors and said second quality indication define a second error metric; and predicting said data rate of said received signal based on a comparison of each of said error metrics.

2. The method of claim 1 further comprising the steps of:

reducing said received signal to produce a third received signal representing a third data rate;

decoding and re-encoding at said third data rate said third received signal to produce a third received signal prediction and to produce a third quality indication; and comparing said third received signal prediction to said third received signal and counting a third number of errors, wherein an error occurs when said third received signal does not match said third received signal prediction, and wherein said third number of errors and said third quality indication define a third error metric.

3. The method of claim 2 further comprising the steps of:

reducing said received signal to produce a fourth received signal representing a fourth data rate;

decoding and re-encoding at said fourth data rate said fourth received signal to produce a fourth received signal prediction and to produce a fourth quality indication; and comparing said fourth received signal prediction to said fourth received signal and counting a fourth number of errors, wherein an error occurs when said fourth received signal does not match said fourth received signal prediction, and wherein said fourth number of errors and said fourth quality indication define a fourth error metric.

4. The method of claim 1 wherein said step of reducing comprises the steps of:

dividing in time said received signal to produce an early received signal and a late received signal; and summing said early received signal and said late received signal to produce said second received signal.

5. The method of claim 1 wherein said received signal is divided in time into a set of segments and wherein said step of reducing comprises the step of selecting a subset of said set of segments of said received signal to produce said second received signal.

6. The method of claim 2 wherein said step of reducing to produce said third signal comprises the steps of:

dividing in time said second received signal to produce an early second received signal and a late second received signal; and summing said early second received signal and said late second received signal to produce said third received signal.

7. The method of claim 2 wherein said second received signal is divided in time into a set of segments and wherein said step of reducing to produce said third signal comprises the step of selecting a subset of said set of segments of said second received signal to produce said third received signal.

8. The method of claim 1 wherein said first quality indication is a Cyclic Redundancy Check result.

9. The method of claim 3 wherein:

said first data rate corresponds to full rate communication;

said second data rate corresponds to half rate communication;

said third data rate corresponds to quarter rate communication; and said fourth data rate corresponds to eighth rate communication.

10. The method of claim 9 wherein said first quality indication, said second quality indication, said third quality indication, and said fourth quality indication are each a single bit binary quality indication wherein a "1" indicates a high probability that said data rate of said received signal is the data rate corresponding to said quality indication and a "0" indicates said data rate of said received signal is not the data rate corresponding to said quality indication.

11. The method of claim 10, wherein said step of predicting said data rate of said received signal comprises the steps of:

predicting said a first data rate if (said first quality indication=1 AND said second quality indication=1) is true and (said first number of errors≦said second number of errors+$T_1$) is true, or if (said first quality indication=1 AND said second quality indication=1) is false and (said first quality indication=1 AND said first number of errors≦$T_2$) is true;

predicting a half-rate indication if (said first quality indication=1 AND said second quality indication=1) is true and (said first number of errors≦said second number of errors+$T_1$) is false, or if (said first quality indication =1 AND said second quality indication=1) is false and (said first quality indication=1 AND said first number of errors≦$T_2$) is false and (said second quality indication=1 AND said second number of errors≦$T_3$) is true and (said fourth quality indication=1 AND (said third quality indication=0 OR said fourth number of errors≦said third number of errors)) is true and (said second number of errors≦said fourth number of errors+$T_4$) is true, or if (said first quality indication=1 AND said second quality indication=1) is false and (said first quality indication=1 AND said first number of errors≦$T_2$) is false and (said second quality indication=1 AND said second number of errors≦$T_3$) is true and (said fourth quality indication=1 AND (said third quality indication=0 OR said fourth number of errors≦said third number of errors)) is false and (said third quality indication=1) is true and (said second number of errors≦said third number of errors+$T_5$) is true, or if (said first quality indication=1 AND said second quality indication=1) is false and (said first quality indication=1 AND said first number of errors≦$T_2$) is false and (said second quality indication=1 AND said second number of errors≦$T_3$) is true and (said fourth quality indication=1 AND (said third quality indication=0 OR said fourth number of errors≦said third number of errors)) is false and (said third quality indication=1) is false;

predicting a quarter-rate indication if (said first quality indication=1 AND said second quality indication=1) is false and (said first quality indication=1 AND said first number of errors≦$T_2$) is false and (said second quality indication=1 AND said second number of errors≦$T_3$) is true and (said fourth quality indication=1 AND (said third quality indication=0 OR said fourth number of errors≦said third number of errors)) is false and (said third quality indication=1) is true and (said second number of errors≦said third number of errors+$T_5$) is false, or if (said first quality indication=1 AND said second quality indication=1) is false and (said first quality indication=1 AND said first number of errors≦$T_2$) is false and (said second quality indication=1 AND said second number of errors≦$T_3$) is false and (said third quality indication=1 AND said fourth quality indication=1) is true and (said fourth number of errors<said third number of errors AND said fourth number of errors≦$T_6$) is false and (said third number of errors<said fourth number of errors AND said third number of errors≦$T_7$) is true, or if (said first quality indication=1 AND said second quality indication=1) is false and (said first quality indication=1 AND said first number of errors≦$T_2$) is false and (said second quality indication=1 AND said second number of errors≦$T_3$) is false and (said third quality indication=1 AND said fourth quality indication=1) is false and (said third quality indication=1 AND said third number of errors≦$T_8$) is true; and predicting an eighth-rate indication if (said first quality indication=1 AND said second quality indication=1) is false and (said first quality indication=1 AND said first number of errors≦$T_2$) is false and (said second quality indication=1 AND said second number of errors≦$T_3$) is true and (said fourth quality indication=1 AND (said third quality indication=0 OR said fourth number of errors≦said third number of errors)) is true and (said second number of errors≦said fourth number of errors+$T_4$) is false, or if (said first quality indication=1 AND said second quality indication=1) is false and (said first quality indication=1 AND said first number of errors≦$T_2$) is false and (said second quality indication=1 AND said second number of errors≦$T_3$) is false and (said third quality indication=1 AND said fourth quality indication=1) is true and (said fourth number of errors≦said third number of errors AND said fourth number of errors≦$T_6$) is true, or if (said first quality indication=1 AND said second quality indication=1) is false and (said first quality indication=1 AND said first number of errors≦$T_2$) is false and (said second quality indication=1 AND said second number of errors≦$T_3$) is false and (said third quality indication=1 AND said fourth quality indication=1) is false and (said third quality indication=1 AND said third number of errors≦$T_8$) is false and (said fourth quality indication=1 AND said fourth number of errors≦$T_9$) is true;

wherein $T_1$, $T_2$, $T_3$, $T_4$, $T_5$, $T_6$, $T_7$, $T_8$, and $T_9$, are fixed constants.

12. The method of claim 11 wherein $T_{10}$ is a fixed constant, further comprising the step of:

producing an unrecoverable error indication if (said first quality indication=1 AND said second quality indication=1 ) is false and (said first quality indication=1 AND said first number of errors≦$T_2$) is false and (said second quality indication=1 AND said second number of errors≦$T_3$) is false and (said third quality indication=1 AND said fourth quality indication=1) is true and (said fourth number of errors≦said third number of errors AND said fourth number of errors≦$T_6$) is false and (said third number of errors<said fourth number of errors AND said third number of errors≦$T_7$) is false, or if (said first quality indication=1 AND said second quality indication=1) is false and (said first quality indication 1 AND said first number of errors≦$T_2$) is false and (said second quality indication=1 AND said second number of errors≦$T_3$) is false and (said third quality indication=1AND said fourth quality indication=1) is false and (said third quality indication=1 AND said third number of errors≦$T_8$) is false and (said fourth quality indication=1 AND said fourth number of errors≦$T_9$) is false and (said first number of errors≦$T_{10}$ ) is false.

13. The method of claim 12, further comprising the step of:

producing a full-rate-with-bit-errors indication if (said first quality indication=1 AND said second quality indication=1) is false and (said first quality indication=1 AND said first number of errors≦$T_2$) is false and (said second quality indication=1 AND said second number of errors≦$T_3$) is false and (said third quality indication=1AND said fourth quality indication=1) is false and (said third quality indication=1 AND said third number of errors≦$T_8$) is false and (said fourth quality indication=1 AND said fourth number of errors≦$T_9$) is false and (said first number of errors≦$T_{10}$) is true.

14. The method of claim 11 wherein said full rate communication is 9,600 bits per second.

15. The method of claim 13 wherein said full rate communication is 9,600 bits per second.

16. The method of claim 13 where in:

$T_1$ has a value equal to 15;
$T_2$ has a value equal to 77;
$T_3$ has a value equal to 60;
$T_4$ has a value equal to 10;
$T_5$ has a value equal to 10;
$T_6$ has a value equal to 64;
$T_7$ has a value equal to 60;
$T_8$ has a value equal to 60;
$T_9$ has a value equal to 64; and
$T_{10}$ has a value equal to 71.

17. The method of claim 13 wherein:

$T_1$ has a value equal to 15;
$T_2$ has a value equal to 110;
$T_3$ has a value equal to 84;
$T_4$ has a value equal to 10;
$T_5$ has a value equal to 10;
$T_6$ has a value equal to 96;
$T_7$ has a value equal to 76;
$T_8$ has a value equal to 76;
$T_9$ has a value equal to 96; and
$T_{10}$ has a value equal to 78.

18. The method of claim 13 wherein:

$T_1$ is about to 4% of the number of symbols in a frame;
$T_2$ is about to 20% of the number of symbols in a frame;
$T_3$ is about to 16% of the number of symbols in a frame;
$T_4$ is about to 3% of the number of symbols in a frame;
$T_4$ is about to 3% of the number of symbols in a frame;
$T_6$ is about to 17% of the number of symbols in a frame;
$T_7$ is about to 16% of the number of symbols in a frame;
$T_8$ is about to 16% of the number of symbols in a frame;
$T_9$ is about to 17% of the number of symbols in a frame; and
$T_{10}$ is about to 19% of the number of symbols in a frame.

19. The method of claim 13 wherein:

$T_1$ is about to 4% of the number of symbols in a frame;

$T_2$ is about to 29% of the number of symbols in a frame;

$T_3$ is about to 22% of the number of symbols in a frame;

$T_4$ is about to 3% of the number of symbols in a frame;

$T_5$ is about to 3% of the number of symbols in a frame;

$T_6$ is about to 25% of the number of symbols in a frame;

$T_7$ is about to 20% of the number of symbols in a frame;

$T_8$ is about to 20% of the number of symbols in a frame;

$T_9$ is about to 25% of the number of symbols in a frame; and $T_{10}$ is about to 20% of the number of symbols in a frame.

20. In a receiver of a variable-rate communication system, a method for decoding a received signal at an unknown data rate comprising the steps of:

decoding at a first data rate said received signal to produce a first decoded received signal and to produce a first quality indication;

re-encoding at said first data rate said first decoded received signal to produce a first received signal prediction;

comparing said first received signal prediction to said received signal and counting a first number of errors, wherein an error occurs when said received signal does not match said first received signal prediction, and wherein said first number of errors and said first quality indication define a first error metric;

decoding at a second data rate said received signal to produce a second decoded received signal and to produce a second quality indication;

re-encoding at said second data rate said second decoded received signal to produce a second received signal prediction;

comparing said second received signal prediction to said received signal and counting a second number of errors, wherein an error occurs when said received signal does not match said second received signal prediction, and wherein said second number of errors and said second quality indication define a second error metric;

predicting said unknown data rate based on a comparison of each of said error metrics; and using said decoded received signal corresponding to said predicted unknown data rate as the bases of further processing.

21. In a receiver of a variable-rate communication system, a method for decoding a received signal at an unknown data rate comprising the steps of:

decoding at a first data rate said received signal to produce a first decoded received signal and to produce a first quality indication;

re-encoding at said first data rate said first decoded received signal to produce a first received signal prediction;

comparing said first received signal prediction to said received signal and counting a first number of errors, wherein an error occurs when said received signal does not match said first received signal prediction, and wherein said first number of errors and said first quality indication define a first error metric;

decoding at a second data rate said received signal to produce a second decoded received signal and to produce a second quality indication;

re-encoding at said second data rate said second decoded received signal to produce a second received signal prediction;

comparing said second received signal prediction to said received signal and counting a second number of errors, wherein an error occurs when said received signal does not match said second received signal prediction, and wherein said second number of errors and said second quality indication define a second error metric;

decoding at a third data rate said received signal to produce a third decoded received signal and to produce a third quality indication;

re-encoding at said third data rate said third decoded received signal to produce a third received signal prediction;

comparing said third received signal prediction to said received signal and counting a third number of errors, wherein an error occurs when said received signal does not match said third received signal prediction, and wherein said third number of errors and said third quality indication define a third error metric; and predicting said unknown data rate based on a comparison of each of said error metrics.

22. The method of claim 21 wherein said first quality indication, said second quality indication, and said third quality indication are each a single bit quality indication wherein a "1" indicates a high probability of successful decoding at said data rate corresponding to said quality indication and a "0" indicates a high probability of defective decoding at said data rate corresponding to said quality indication.

23. The method of claim 22 wherein said step of predicting comprises the step of predicting a first predicted data rate if said first quality indication is equal to "1" and if said first number of errors is less than a threshold number.

24. The method of claim 22 wherein said step of predicting comprises the step of predicting said first data rate if said first quality indication is equal to "1" and said second quality indication is equal to "1" and if said first number of errors is less than or equal to said second number of errors plus a predetermined number.

25. The method of claim 22 wherein said first data rate is 14,400 bits per second.

26. In a receiver receiving a signal having an unknown data rate wherein said receiver decodes and re-encodes said signal at a plurality of data rates, generates a quality indication for each of said plurality of data rates, and compares each decoded and re-encoded signal with said signal, and counts a number of errors in said comparison, a method for decoding said signal comprising the steps of:

selecting a first data rate if said quality indication corresponding to said first data rate indicates successful decoding at said first data rate and if said number of errors corresponding to said first data rate is less than a first threshold; and selecting a second data rate if said quality indication corresponding to said first data rate indicates successful decoding and said quality indication corresponding to said second data rate indicates successful decoding and if said number of errors corresponding to said first data rate exceeds a second threshold.

27. The method for decoding of claim 26 wherein said first threshold is a predetermined constant.

28. The method for decoding of claim 26 wherein said first threshold is a predetermined constant plus said number of errors corresponding to said second data rate.

29. The method for decoding of claim 26 wherein said first threshold and said second threshold are equal and are a predetermined constant plus said number of errors corresponding to said second data rate.

30. The method for decoding of claim 26 further comprising the steps of:
   selecting said second data rate if said quality indication corresponding to said first data rate indicates unsuccessful decoding at said first data rate and if said quality indication corresponding to said second data rate indicates successful decoding at said second data rate and if said quality indication corresponding to a third data rate indicates unsuccessful decoding at said third data rate and if said quality indication corresponding to a fourth data rate indicates successful decoding at said fourth data rate and said number of errors corresponding to said second data rate is less than or equal to a third threshold.

31. The method for decoding of claim 30 wherein said third threshold is a predetermined constant plus said number of errors corresponding to said fourth data rate.

32. The method for decoding of claim 26 further comprising the step of:
   selecting a fourth data rate if said quality indication corresponding to said first data rate indicates unsuccessful decoding at said first data rate and if said quality indication corresponding to said second data rate indicates successful decoding at said second data rate and if said quality indication corresponding to a third data rate indicates unsuccessful decoding at said third data rate and if said quality indication corresponding to said fourth data rate indicates successful decoding at said fourth data rate and said number of errors corresponding to said second data rate exceeds a third threshold.

33. The method for decoding of claim 32 wherein said third threshold is a predetermined constant plus said number of errors corresponding to said fourth data rate.

34. The method for decoding of claim 26 further comprising the step of:
   selecting said second data rate if said quality indication corresponding to said first data rate indicates unsuccessful decoding at said first data rate and if said quality indication corresponding to said second data rate indicates successful decoding at said second data rate and if said quality indication corresponding to a third data rate indicates unsuccessful decoding at said third data rate and if said quality indication corresponding to said fourth data rate indicates unsuccessful decoding at said fourth data rate.

35. The method for decoding of claim 26 further comprising the steps of:
   selecting said second data rate if said quality indication corresponding to said first data rate indicates unsuccessful decoding at said first data rate and if said quality indication corresponding to said second data rate indicates successful decoding at said second data rate and if said quality indication corresponding to a third data rate indicates successful decoding at said third data rate and if said quality indication corresponding to said fourth data rate indicates successful decoding at said fourth data rate and said number of errors corresponding to said second data rate is less than or equal to said number of error corresponding to said third data rate plus a fixed constant.

36. The method for decoding of claim 26 further comprising the step of:
   selecting said third data rate if said quality indication corresponding to said first data rate indicates unsuccessful decoding at said first data rate and if said quality indication corresponding to said second data rate indicates successful decoding at said second data rate and if said quality indication corresponding to a third data rate indicates successful decoding at said third data rate and if said quality indication corresponding to said fourth data rate indicates successful decoding at said fourth data rate and said number of errors corresponding to said second data rate exceeds said number of error corresponding to said third data rate plus a fixed constant.

37. The method for decoding of claim 26 further comprising the steps of:
   selecting a fourth data rate if said quality indication corresponding to said first data rate indicates unsuccessful decoding at said first data rate and if said quality indication corresponding to said second data rate indicates unsuccessful decoding at said second data rate and if said quality indication corresponding to a third data rate indicates unsuccessful decoding at said third data rate and if said quality indication corresponding to said fourth data rate indicates successful decoding at said fourth data rate and said number of errors corresponding to said fourth data rate is less than or equal a third predetermined threshold.

38. An apparatus for estimating a data rate of a signal received from a transmitter capable of transmitting data at a plurality of data rates comprising:
   a first decoder having an input coupled to said signal and having a decoded signal output and a quality indication output;
   a first encoder having an input coupled to said decoded signal output of said first decoder and having an output;
   a first comparator having a first input coupled to said output of said first encoder and having a second input coupled to said signal and having an output;
   a first counter having an input coupled to said output of said first comparator and having an output;
   a second decoder having an input coupled to said signal and having a decoded signal output and a quality indication output;
   a second encoder having an input coupled to said decoded signal output of said second decoder and having an output;
   a second comparator having a first input coupled to said output of said second encoder and having a second input coupled to said signal and having an output;
   a second counter having an input coupled to said output of said second comparator and having an output; and
   a processor having a plurality of inputs and an output, wherein a first input is coupled to said output of said first counter, a second input is coupled to said output of second counter, a third input is coupled to said quality indication output of said first decoder, and a fourth input is coupled to said quality indication output of said second decoder;
   wherein said output of said processor estimates said data rate of said signal.

39. An apparatus for estimating a data rate of a signal received from a transmitter capable of transmitting data at a plurality of data rates comprising:
   decoding means for sequentially decoding said signal at a plurality of data rates, for sequentially producing a decoded signal output corresponding to each of said plurality of data rates and for sequentially providing a quality indication output corresponding to each of said plurality of data rates;

encoder means for sequentially encoding said decoded signal output corresponding to each of said plurality of data rates and sequentially producing an estimated received signal corresponding to each of said plurality of data rates;

means for sequentially comparing said signal with said estimated received signal corresponding to each of said plurality of data rates and producing an indication when said estimated receives signal is in error with respect to said signal;

means for sequentially counting a number of said indications corresponding to each of said plurality of data rates; and processing means for receiving said number of indications corresponding to each of said plurality of data rates and said quality indication output corresponding to each of said plurality of data rates and for estimating said data rate of said signal.

40. In a receiver receiving a signal having an unknown data rate wherein said receiver Viterbi decodes and re-encodes said signal at a plurality of data rates, generates a quality indication for each of said plurality of data rates, and compares each Viterbi decoded and re-encoded signal with said signal, and counts a number of errors in said comparison, a method for decoding said signal comprising the steps of:

selecting a first data rate if said quality indication corresponding to said first data rate indicates successful decoding at said first data rate and if said number of errors corresponding to said first data rate is less than a first threshold; and selecting a second data rate if said quality indication corresponding to said first data rate indicates successful decoding and said quality indication corresponding to said second data rate indicates successful decoding and if said number of errors corresponding to said first data rate exceeds a second threshold.

41. The method for decoding of claim 40 wherein said first threshold is a predetermined constant.

42. The method for decoding of claim 40 wherein said first threshold is a predetermined constant plus said number of errors corresponding to said second data rate.

43. The method for decoding of claim 40 wherein said first threshold and said second threshold are equal and are a predetermined constant plus said number of errors corresponding to said second data rate.

44. The method for decoding of claim 40 further comprising the step of selecting said second data rate if said quality indication corresponding to said first data rate indicates unsuccessful decoding at said first data rate and if said quality indication corresponding to said second data rate indicates successful decoding at said second data rate and if said quality indication corresponding to a third data rate indicates unsuccessful decoding at said third data rate and if said quality indication corresponding to a fourth data rate indicates successful decoding at said fourth data rate and said number of errors corresponding to said second data rate is less than or equal to a third threshold.

45. The method for decoding of claim 44 wherein said third threshold is a predetermined constant plus said number of errors corresponding to said fourth data rate.

46. The method for decoding of claim 40 further comprising the step of selecting a fourth data rate if said quality indication corresponding to said first data rate indicates unsuccessful decoding at said first data rate and if said quality indication corresponding to said second data rate indicates successful decoding at said second data rate and if said quality indication corresponding to a third data rate indicates unsuccessful decoding at said third data rate and if said quality indication corresponding to said fourth data rate indicates successful decoding at said fourth data rate and said number of errors corresponding to said second data rate exceeds a third threshold.

47. The method for decoding of claim 46 wherein said third threshold is a predetermined constant plus said number of errors corresponding to said fourth data rate.

48. The method for decoding of claim 40 further comprising the step of selecting said second data rate if said quality indication corresponding to said first data rate indicates unsuccessful decoding at said first data rate and if said quality indication corresponding to said second data rate indicates successful decoding at said second data rate and if said quality indication corresponding to a third data rate indicates unsuccessful decoding at said third data rate and if said quality indication corresponding to said fourth data rate indicates unsuccessful decoding at said fourth data rate.

49. The method for decoding of claim 40 further comprising the steps of selecting said second data rate if said quality indication corresponding to said first data rate indicates unsuccessful decoding at said first data rate and if said quality indication corresponding to said second data rate indicates successful decoding at said second data rate and if said quality indication corresponding to a third data rate indicates successful decoding at said third data rate and if said quality indication corresponding to said fourth data rate indicates successful decoding at said fourth data rate and said number of errors corresponding to said second data rate is less than or equal to said number of error corresponding to said third data rate plus a fixed constant.

50. The method for decoding of claim 40 further comprising the step of selecting said third data rate if said quality indication corresponding to said first data rate indicates unsuccessful decoding at said first data rate and if said quality indication corresponding to said second data rate indicates successful decoding at said second data rate and if said quality indication corresponding to a third data rate indicates successful decoding at said third data rate and if said quality indication corresponding to said fourth data rate indicates successful decoding at said fourth data rate and said number of errors corresponding to said second data rate exceeds said number of error corresponding to said third data rate plus a fixed constant.

51. The method for decoding of claim 40 further comprising the step of selecting a fourth data rate if said quality indication corresponding to said first data rate indicates unsuccessful decoding at said first data rate and if said quality indication corresponding to said second data rate indicates unsuccessful decoding at said second data rate and if said quality indication corresponding to a third data rate indicates unsuccessful decoding at said third data rate and if said quality indication corresponding to said fourth data rate indicates successful decoding at said fourth data rate and said number of errors corresponding to said fourth data rate is less than or equal a third predetermined threshold.

* * * * *